US006596434B1

United States Patent
Yoshinaka et al.

(10) Patent No.: US 6,596,434 B1
(45) Date of Patent: Jul. 22, 2003

(54) CYLINDRICAL TYPE ALKALINE STORAGE BATTERY

(75) Inventors: Takeshi Yoshinaka, Kanagawa (JP); Norio Suzuki, Osaka (JP); Hideo Kaiya, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/701,101

(22) PCT Filed: Feb. 7, 2000

(86) PCT No.: PCT/JP00/00639
§ 371 (c)(1),
(2), (4) Date: Jan. 19, 2001

(87) PCT Pub. No.: WO00/59054
PCT Pub. Date: Oct. 5, 2000

(30) Foreign Application Priority Data

Mar. 25, 1999 (JP) .............................. 11-081137

(51) Int. Cl.[7] .......................... H01M 6/10; H01M 2/12; H01M 2/02
(52) U.S. Cl. .............................. 429/94; 429/54; 429/82; 429/164; 429/185
(58) Field of Search .................... 429/94, 175, 176, 429/164, 185, 174, 168, 170, 57, 53, 82, 206, 166, 54, 79

(56) References Cited

U.S. PATENT DOCUMENTS 5,586,993 A * 12/1996 Saito et al. ................ 29/623.2

FOREIGN PATENT DOCUMENTS

| EP | 0 692 829 | 1/1996 | |
| JP | 57-174856 | * 10/1982 | .......... H01M/10/48 |
| JP | 10-261397 | 9/1998 | |

OTHER PUBLICATIONS

Japanese Abstract, Publ. No. 57174856, dated Oct. 27, 1982.
Japanese Abstract, Publ. No. 01021860, dated Jan. 28, 1989.
International Search Report for PCT/JP00/000639 dated Jun. 14, 2000.

* cited by examiner

Primary Examiner—Stephen Kalafut
Assistant Examiner—Raymond Alejandro
(74) Attorney, Agent, or Firm—RatnerPrestia

(57) ABSTRACT

A cylindrical type alkaline storage battery includes a metallic case, a sealing plate for the metallic case, and a spiral-shaped group of electrodes. The group of electrodes includes a positive electrode plate, a negative electrode plate and a separator. The sealing plate includes a cap-shaped terminal plate, which includes a cap part and a flange, and a disc-shaped filter on the underside of the flange. The disc shaped filter has a gas venting hole in its center. A safety valve is included between the flange and the filter. A space between the metallic case and the rims of the flange and of the filter is sealed with a gasket.

15 Claims, 4 Drawing Sheets

CYLINDRICAL TYPE ALKALINE STORAGE BATTERY

FIELD OF THE INVENTION

The present invention relates to a cylindrical type alkaline storage battery.

BACKGROUND OF THE INVENTION

There are a variety of cylindrical type storage batteries available at present, and typical ones are a nickel-cadmium storage battery, a nickel-hydrogen storage battery and the like. These batteries are suitable as a power source for small size equipment and are widely used in various kinds of applications such as a portable telephone, a notebook PC and the like. As the equipment using a battery becomes smaller in size, it is required that a cylindrical type alkaline storage battery should be the safer in operation, smaller in size and larger in capacity.

FIG. 5 is a schematic cross-sectional view of a prior art cylindrical type alkaline storage battery D. In FIG. 5, the reference symbol D1 is a sealing plate, reference symbol 1 is a conductive filter, reference symbol la is a gas venting hole located in the center of the filter 1, reference symbol 2 is a safety valve, reference symbol 4 is an insulating gasket, reference symbol 5 is a metallic case, reference symbol 6 is a belt-shaped positive electrode plate, reference symbol 7 is a belt-shaped negative electrode plate, reference symbol 8 is a separator, reference symbol 9 is a lead tab electrically connecting the positive electrode plate 6 to the filter 1, reference symbol 10 is a lead tab electrically connecting the negative electrode plate 7 to the inner surface of the case 5, reference symbol 11 is an insulating ring, reference symbol 14 is a cap-shaped terminal plate of the prior art sealing plate D1, reference symbol 14a is a top part of the prior art cap-shaped terminal plate 14 and reference symbol 14b is a Range of the prior art cap-shaped terminal plate 14.

As shown in FIG. 5, the belt-shaped positive electrode plate 6 and negative electrode plate 7 are wound in a spiral with the separator 8 sandwiched there-between to form a group of electrode plates. The cylindrical type alkaline battery comprises the foregoing group of electrode plates, the metallic case 5 containing the group of electrode plates and the sealing plate D1 disposed on the top part of the metallic case 5.

The safety valve 2 is disposed between the cap-shaped terminal plate 14 and the filter 1 so as to close the gas venting hole la and the foregoing filter 1 is bent in such a way as sandwiching the rim of the flange 14b and swaged thereto, thereby constituting a single-piece structure of the sealing plate D1.

The insulating gasket 4 is disposed between the part of the single-piece structured sealing plate D1, where the foregoing swaging has taken place, and the metallic case 5, and the edge of the metallic case 5 is bent forcefully inward, thereby sealing the metallic case 5 hermetically. A current path between the cap-shaped terminal plate 14 and the filter 1 is secured at the place where the swaging of the filter 1 onto the rim of the sealing plate 14 has taken place. Almost all of an electrolyte, which is not shown in FIG. 5, is held within the group of electrode plates.

In the Published Unexamined Japanese Patent Application No. H10-261397, a sealing plate of one-piece design realized by a flange of a cap-shaped terminal plate welded on a filter is disclosed, thereby demonstrating a structure, in which only the filter of the single-piece structured sealing plate is sealed via a gasket disposed between the filter and a metallic case by bending forcefully the edge of the metallic case inward.

In general, a sealing plate of a cylindrical type alkaline storage battery is required to perform such fundamental functions as hermetic sealing of the battery, safe controlling of a battery's internal pressure and forming of a current path for battery's charging/discharging. The amount of active material that creates battery's capacity is limited by the internal volume of a battery case to accommodate the active material and, on the other hand, the sealing plate is a factor responsible for the reduction of the battery's internal volume. In order for the battery's capacity to be increased, therefore, a sealing plate structure which is as simple as possible and causes the smallest reduction to the battery's internal volume is sought, yet, without sacrificing the aforementioned fundamental functions that the battery's sealing plate is expected to fulfill with a high degree of reliability. From this point of view, the prior art sealing plate as described in the above has demonstrated the following problems:

First, the structural design employed in realizing a single-piece sealing plate by sandwiching the rim of the flange 14b of the cap-shaped terminal plate 14 between the bent portions of the filter 1 and swaging the metal pieces involved one another not only makes the design of needed component parts complicated but also results in a bulky structure at the swaged segment of the filter 1 due to folding over the edge thereof thereby reducing the battery's internal volume to an intolerable extent and hindering the attempt to increase the battery's capacity.

Next, the structural design employed in realizing another single-piece sealing plate by joining the cap-shaped terminal plate 14 and the filter 1 by welding makes the design of needed component parts complicated in the same way as the above and also results in a loss of the battery's internal volume due to a complicated structure of the safety valve 2. Furthermore, when break down at the welding point is brought from an inadvertently weak welding in production process or corrosion, vibration and infliction during the use of the battery, the current path can not be secured and further a reduction of reliability in the sealing point is brought about by the breakage of the welded segment since only the side of the filter 1 of the sealing plate D1 is performing a sealing function between the sealing plate D1 and the metallic case 5.

In addition, with a cylindrical type alkaline storage battery, phenomena like excessive current flow are recognized which cause abrupt rise in the internal pressure and leakage of large amount of gas likely when an inappropriate charge circuit is used or a charge circuit is out of order or an inappropriate charging condition is set up. In order to cope with this unusual rise in the internal pressure under abnormal conditions and secure a safe operation of the battery, a safety valve mechanism as shown in FIG. 5 is usually employed. However, when the aforementioned unusually excessive current flows over a prolonged period, not only a safety control problem caused by a released gas and but also battery performance problems which are caused by drying up of electrolyte and accelerated deterioration of separators due to over heating. In such a case, normal performance is not recovered even if the charge current is returned to the normal level, may be resulted. Therefore, it is required of a sealing plate to include a reversible mechanism whereby the electric circuit is interrupted when an unusually excessive current such as above continues therein and the electric-circuit is preferably recovered when the internal pressure returns to the normal level.

The present invention aims at improving the safety control of the internal pressure and enhances the reliability of the electric current path while achieving a simplification of the mechanism as described above, and, at the same time, maintains the required internal volume of the battery and, further, also aims at realizing a new mechanism whereby interruption of excessive current flows and recovery of the electric current path upon reduction of the internal pressure are made possible.

DISCLOSURE OF THE INVENTION

What is disclosed by the present invention in dealing with the foregoing problems is as follows:

With a cylindrical type alkaline storage battery comprising a group of spirally wound electrode plates formed of belt-shaped positive electrode plates and negative electrode plates and separators, a metallic case containing the group of electrode plates therein and a sealing plate, the sealing plate comprises:

a cap-shaped terminal plate formed of a cap part and a flange; and
  a disc-shaped filter provided with a gas venting hole near the center thereof and adjoining the underside of the flange of the cap-shaped terminal plate, wherein the edge of the metallic case is bent forcefully inward, thereby sealing a space between the metallic case and both of rims of the flange of the cap-shaped terminal plate and the disc-shaped filter together via a gasket.

As described in the above, by employing parts with simple construction such as before said cap-shaped terminal plate and a filter and a gasket and by employing simple means such as bending forcefully the edge of the metallic case inward, all operations of fixing the sealing plate, forming the structure of a sealing plate and sealing the space between the sealing plate and metallic case via the gasket are completed at one time. Therefore, a filter is no longer required to be bent at the edge thereof and one layer of the double layer at the edge thereof is no longer required, both of which are needed in the prior art battery structure, thus resulting in saving the space required to accommodate the components of complicated construction otherwise and enabling the loss in the available internal volume of the battery case to be minimized.

According to the present invention, the both of rims of the filter and the flange of the cap-shaped terminal plate are forced into the inside of the gasket by the edge of the metallic case that is bent forcefully inward. At that time, strong pressing force is applied to the foregoing two adjoining materials due to the elasticity of the gasket, thereby establishing a current path between the filter and the cap-shaped terminal plate, which are brought into a close contact with each other. Therefore, unlike the prior art battery, regardless whether welding is applied or not to join the filter and the cap-shaped terminal plate together or the condition at the junction thereof, high reliability of the current path can be ensured. In addition, the filter and the flange of the cap-shaped terminal plate are brought into intimate contact with the gasket, respectively, and high sealing reliability can be ensured without any influence imposed by the conditions of fractures at a welded spot.

Moreover, by making the cap-shaped terminal and filter detachable each other in establishing the adjoining structure and also making the gasket elastic, it is made possible for the contacting condition between the two surfaces of the flange of the cap-shaped terminal plate and the filter to be variable. On the other hand, there is a gas venting hole located near the center of the filter and the cap-shaped terminal plate can be made first to be imposed with the internal pressure before the filter by imposing a restriction on or suppressing a release of the pressure. When the aforementioned contact condition varies, the contact resistance between the flange of the cap-shaped terminal plate and the filter is varied accordingly, thereby bringing about a favorable reaction such as suppressing or interrupting electric current flow according to the internal pressure and recovering the electric current path when the pressure is reduced.

With a cylindrical type alkaline storage battery comprising a group of electrode plates formed of belt-shaped positive and negative electrode plates and separators and spirally wound and, a metallic case containing a group of electrode plates therein and a sealing plate provided with a safety valve inside thereof and sealing hermetically the top part of the metallic case, the sealing plate in a first exemplary embodiment of the present invention comprises:

a cap-shaped terminal plate formed of a cap part and a flange; and a disc-shaped filter provided with a gas venting hole near the center thereof and adjoining the underside of the flange of the cap-shaped terminal plate, wherein a gas exhaust hole is provided on the surface of the cap parts of the cap-shaped terminal plate, where no contacting with the filter takes place, also a safety valve is provided between the cap-shaped terminal plate and the disc-shaped filter, and the edge of the metallic case is bent forcefully inward, thereby a space between the metallic case and both of the rims of the flange of the cap-shaped terminal plate and disc-shaped filter, which are adjoining each other, is sealed together via a gasket.

With a cylindrical type alkaline storage battery comprising a spiral-shape group of electrode plates formed of belt-shaped positive and negative electrode plates and separators, a metallic case containing the group of electrode plates therein and a sealing plate to seal hermetically the top part of the metallic case, the sealing plate in a second exemplary embodiment of the present invention comprises:

a cap-shaped terminal plate formed of a cap part and a flange; and
  a disc-shaped filter adjoining the underside of the flange and provided with a gas venting hole near the center thereof wherein the edge of the metallic case is bent forcefilly inward, thereby a space between the metallic case and both of the rims of the flange of the cap-shaped terminal plate and the disc-shaped filter, which are adjoining each other, is sealed together via the gasket.

With a cylindrical type alkaline storage battery comprising a spirally-shaped group of electrode plates formed of belt-shaped positive and negative electrode plates and separators, a metallic case containing the group of electrode plates therein and a sealing plate at the top part of the metallic case. The sealing plate in a third exemplary embodiment of the present invention comprises:

a cap-shaped terminal plate formed of a cap part and a flange; and a discshaped filter adjoining the underside of the flange of the cap-shaped terminal plate and provided with a gas venting hole near the center thereof, wherein at least one gas exhaust hole is provided on the flange of the cap-shaped terminal which is in contact with filter and the edge of the metallic case is bent forcefully inward, thereby a space between the case and both of rims of the flange of the cap-shaped terminal plate and the disc-shaped filter, which are adjoining each other, is sealed together via a gasket.

A fourth exemplary embodiment of the present invention is characterized by making the outer diameter of the flange of the cap-shaped terminal plate the same as the outer diameter of the filter in the first exemplary embodiment to the third exemplary embodiment, thereby enhancing the reliability of each respective finction realized by the present invention.

A fifth exemplary embodiment of the present invention is characterized by applying a sealing agent to the portion between the flange of the cap-shaped terminal plate and the filter in the first exemplary embodiment to the fourth exemplary embodiment. The performance enhances thereby the reliability in resistance to electrolyte leakage of the battery incorporating the present invention.

A sixth exemplary embodiment of the present invention is characterized by using a material selected from the group of fluorine resin, blown asphalt and silicon resin as a sealing agent in the fifth exemplary embodiment, thereby enhancing the reliability of sealing of the battery incorporating the present invention.

A seventh exemplary embodiment of the present invention is characterized by welding a part of interface between the flange of the cap-shaped terminal plate and the filter according to a laser welding method or a resistance welding method in the first exemplary embodiment to the fourth exemplary embodiment, thereby enhancing the reliability of the electric current path of the battery incorporating the present invention and also contributing to a production process simplification through integrated handling of components.

DETAILED DESCRIPTION OF PREFERRED EMBODIMENTS

Figure 1:
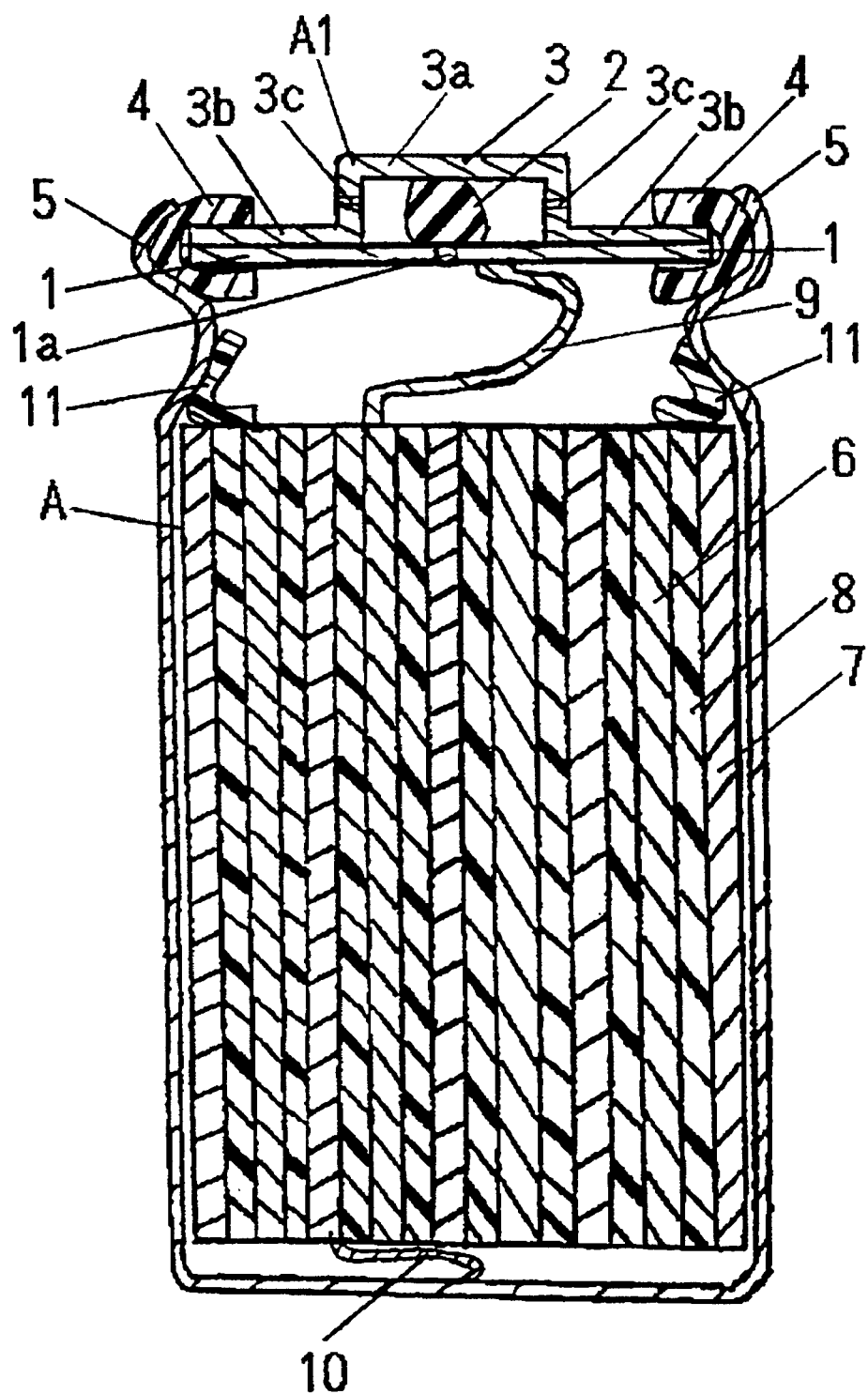
FIG. 1 is a cross-sectional view of a cylindrical type alkaline storage battery A in a first exemplary embodiment of the present invention.

Next, a detailed description is given to preferred embodiments of the present invention as applied to a nickel-hydrogen storage battery with reference to FIG. 1 to FIG. 4.

In FIG. 1 to FIG. 4, the reference symbols A1, B1 and C1 are, respectively, a sealing plate of a nickel-hydrogen storage battery in a first exemplified embodiment to a third exemplary embodiment of the present invention, reference symbol 1 is a filter, the reference symbol 1a is a gas venting hole, reference symbol 2 is a rubber-made safety valve, reference symbol 3 is a cap-shaped terminal plate of the sealing plate A1, reference symbol 3a is a cap part of the cap-shaped terminal plate 3, reference symbol 3b is a flange of the cap-shaped terminal plate 3, reference symbol 3c is a gas exhaust hole of the cap-shaped terminal plate 3, reference symbol 4 is a gasket, reference symbol 5 is a metallic case, reference symbol 6 is a positive electrode plate prepared by filling an active material paste formed mainly of nickel hydroxide in a belt-shaped porous metallic element, reference symbol 7 is a belt-shaped negative electrode plate prepared by applying a hydrogen absorbing alloy paste on a punching metal sheet, reference symbol 8 is a separator formed of polypropylene, reference symbol 9 is a lead tab, reference symbol 10 is a lead tab and reference symbol 11 is an insulating ring formed of polypropylene. With the sealing plate B1 of FIG. 2, the reference symbol 12 is a cap-shaped terminal plate, and the reference symbol 12a is a cap part and reference symbol 12b is a flange, respectively, of the cap-shaped terminal plate 12. With the sealing plate C1 in FIG. 3 and FIG. 4, the reference symbol 13 is a cap-shaped terminal plate, the reference symbol 13a is a cap part and reference symbol 13b is a flange, respectively, of the cap-shaped terminal plate 13, and the reference symbol 13d is a gas exhaust hole and reference symbol 13e is a gap.

The belt-shaped positive. electrode plate 6 and negative electrode plate 7 are wound spirally with the separator 8 sandwiched therebetween to form a group of electrode plates. The foregoing group of electrode plates is contained in the metallic case 5. Although the group of electrode plates is not shown in the drawing, the end part of the positive electrode plate 6 is sticking out of the upper end of the negative electrode plate 7 and connected to the bottom part of the filter 1 via the lead tab 9. The bottom end of the negative electrode 7 is arranged to stick out of the bottom end of the positive electrode plate 6 when the electrode plates are wound, and is connected to the bottom part of the battery case 5 via the lead tab 10. On the top of the group of electrode plates is disposed the insulating ring 11, atop which the cap-shaped terminal plate 12 and filter 1, both constituting the sealing plate B1, is disposed. A space between the metallic case 5 and both rims of the flange 3b of the cap-shaped terminal plate 12 and disc-shaped filter 1 constituting the sealing plate B1, is filled with the gasket 4 and sealed entirely by having the edge of the metallic case 5 bent forcefully inward. An electrolyte, not shown in the drawing, is held in the group of electrode plates.

Next, in the structural geometry of FIG. 1, a detailed description is given to the structure and function of a sealing plate.

A sealing plate Al comprises a cap-shaped terminal plate 3 and a disc-shaped filter 1 which has a gas venting hole 1a near the center and is disposed under a flange 3b of the cap-shaped terminal plate 3. A safety valve 2 is put in a place between the cap-shaped terminal plate 3 and the filter 1. An insulating and elastic gasket 4 is provided between the metallic case and both of the rims of flange of the cap-shaped terminal plate 3 and the filter 1 put together adjacent to each other. When the edge of the metallic case 5 is bent forcefully inward, both of rims of a flange 3b of the cap-shaped terminal plate 3 and the filter 1 which are put together each other, going into the gasket 4. Thereby, the performance completes forming of a sealing plate structure that has safety valve provision and sacrifices less in the internal volume of the metallic case 5, locking of the sealing plate structure in place and sealing of the metallic case 5 being performed at the same time. At the rim of the foregoing sealing plate structure engaged with the gasket 4, the two surfaces of the flange 3b and filter 1 are pressed together, resulting in the establishment of a highly reliable electric current path.

Figure 2:
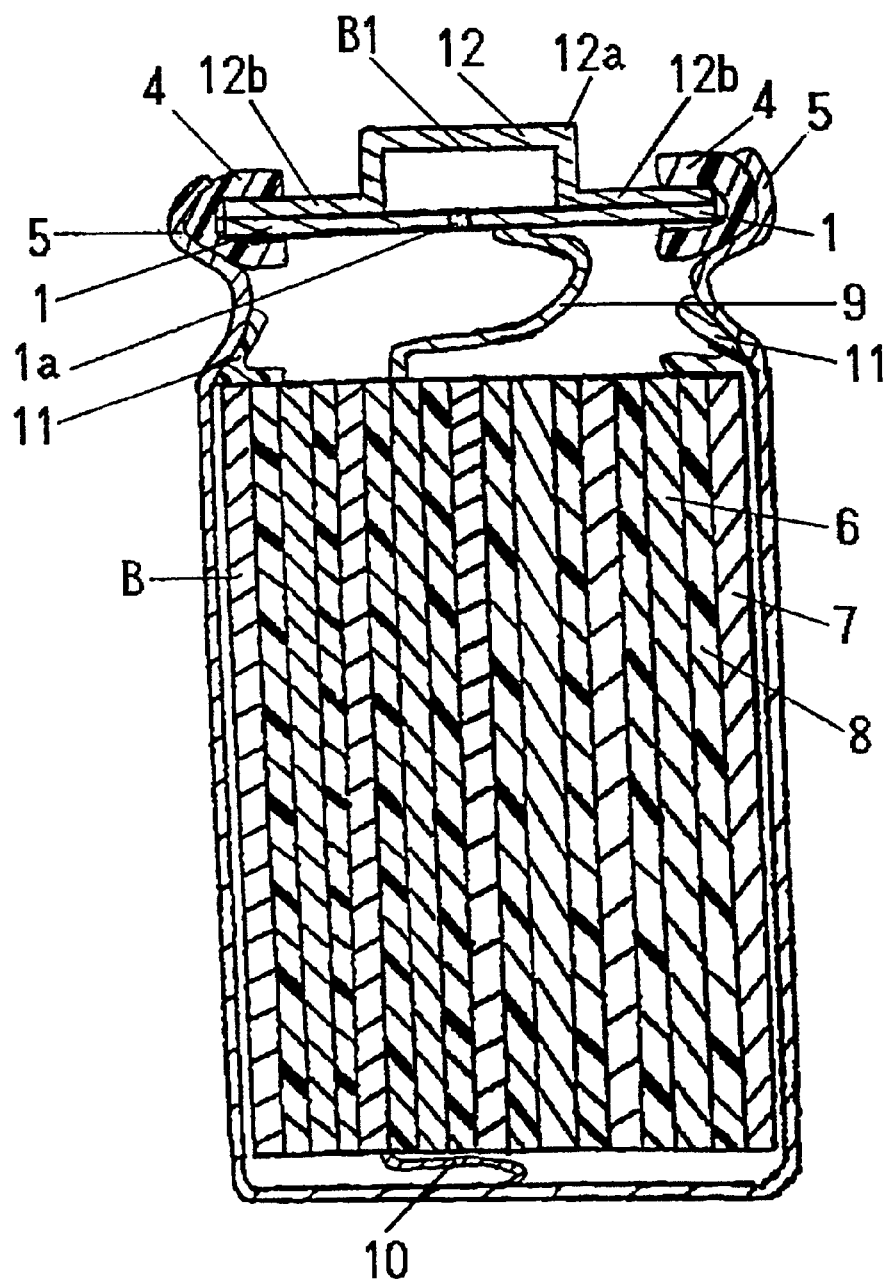
FIG. 2 is a cross-sectional view of a cylindrical type alkaline storage battery B in a second exemplary embodiment of the present invention.

The structural geometry of FIG. 2 relates to a cylindrical alkaline storage battery B comprising a spiral-shaped group of electrode plates, a metallic case 5 containing the group of electrode plates and a sealing plate B1 hermetically sealing the top part of the metallic case 5.

The sealing plate B1 is formed of a cap-shaped terminal plate 12 having no gas exhaust hole and disc-shaped filter 1, which is disposed on the underside of a flange 12b of the cap-shaped terminal plate 12 attached closely thereto. It has a gas venting hole 1a near the center. The sealing plate B1 is formed by the same means as employed in the structural geometry of FIG. 1 and also sealing between the sealing plate B1 and the metallic case 5 is performed via a gasket 4. This structural geometry employs the cap-shaped plate 12 that has no gas exhaust hole and no safety valve.

Accordingly, when an internal pressure increases, the higher internal pressure is imposed on the cap-shaped terminal plate 12 through the gas venting hole 1a of the filter 1. At that time, large force to push up the cap-shaped terminal plate 12 and to separate the cap-shaped terminal plate 12 from the filter 1 is produced. When an unusually excessive charge current flows under the foregoing condition, the flow of the charge current is suppressed due to increased contact resistance between the flange 12 of the cap-shaped terminal plate 12 and the filter 1 and may be ultimately suspended. However, when the internal pressure is reduced so as to have the charge current returned to the normal level, the electric current path can be returned to the original state. Therefore, according to the present invention, a safety control function against pressure and electric current can be performed by a simple mechanism that is different from the prior art mechanism employing a safety valve.

Figure 3:
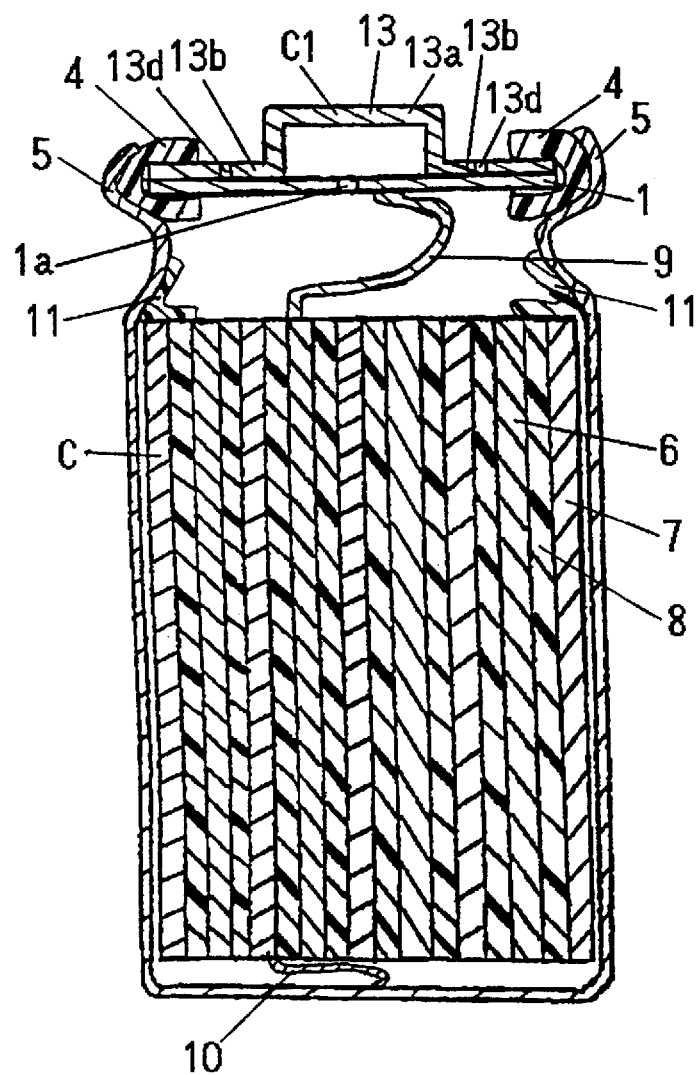
FIG. 3 is a cross-sectional view of a cylindrical type alkaline storage battery C in a third exemplary embodiment of the present invention

The structural geometry of FIG. 3 relates to a cylindrical alkaline storage battery C comprising a spirally-shaped group of electrode plates formed of a positive electrode plate 6, a negative electrode plate 7 and a separators 8, a metallic case 5 containing the group of electrode plates and a sealing plate C1 hermetically sealing the top part of the metallic case 5.

The sealing plate C1 comprises a cap-shaped terminal plate 13, which is formed of a cap part 13a and a fange 13b, and a filter 1 disposed on the underside of the flange 13b attached closely thereto and having a gas venting hole 1a. In addition, at least one gas exhaust hole 13d is provide on the surface of the flange 13b of the cap-shaped terminal plate 13, where the flange 13b comes into contact with the filter 1. The works forming sealing plate structure, fixing the sealing plate structure in place and sealing the metallic case 5 are performed at the same time by bending forcefully the edge of the metallic case inward according to the same steps as adopted in the structural geometry of FIG. 2.

Figure 4:
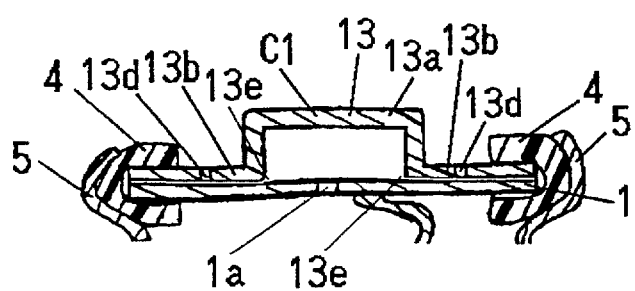
FIG. 4 is a schematic diagram of a positional state of a sealing plate C1 in a fourth exemplary embodiment of the present invention.
Figure 5:
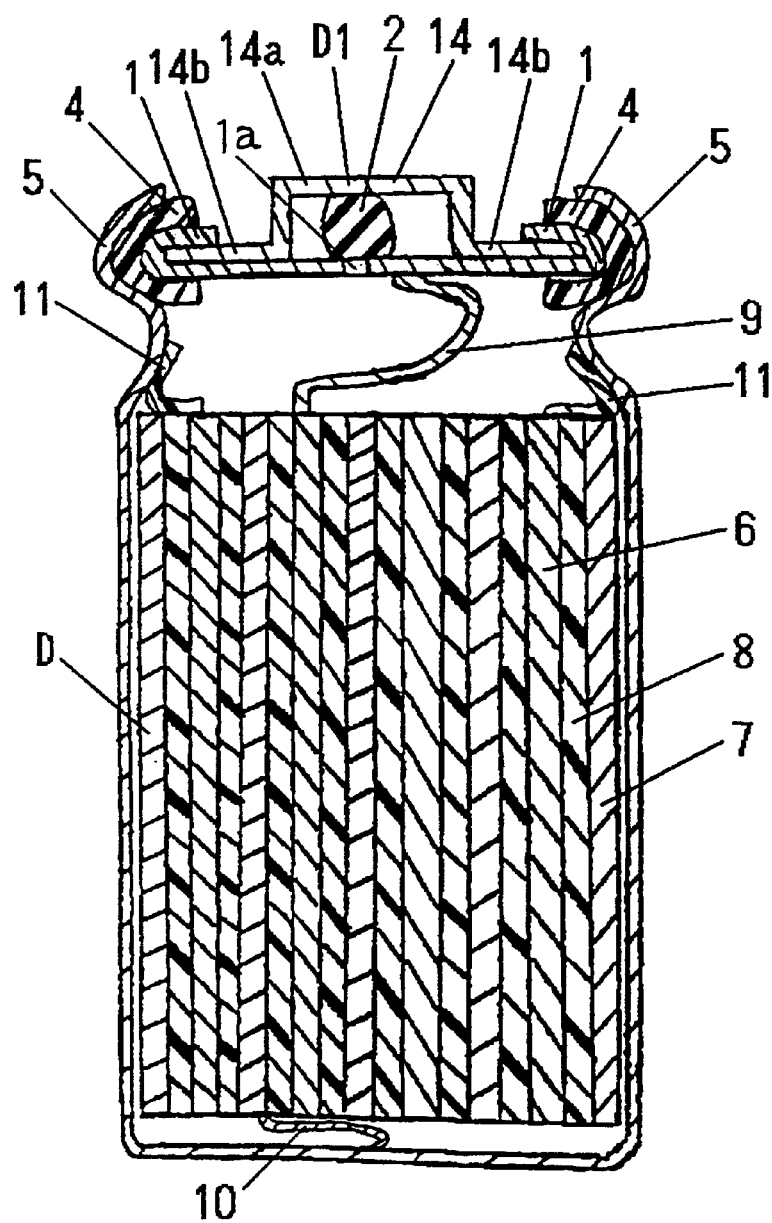
FIG. 5 is a cross-sectional view of a prior art cylindrical type alkaline storage battery D.

With the sealing plate C1 thus constructed, when the internal pressure is increased excessively, its pressing force attacks the cap-shaped terminal plate 13 via vent hole of the filter. When the cap-shaped terminal plate 13 is pushed upward, the function of suppressing a flow of excessive electric currents and ultimately suspending the flow of the electric currents. When the internal pressure is reduced, the function of recovering the electric current path is realized being provided according to the operating principle as explained relative to the structural geometry of FIG. 2. Furthermore, in addition to the foregoing electric current limiting function, the structure in view of FIG. 3 provides a function of controlling the internal pressure also by releasing gas through gap e is formed and gas exhaust hole 13d. FIG. 4 shows the state of operation of the sealing plate C1 when the internal pressure is increased.

The corresponding pressure level for suppressing and suspending of electric currents can be produced by the choice of the size of the gas exhaust hole 13d, the wall thickness of the metallic case 5, the thickness and elasticity of the gasket 4 and the strength of bending force the edge of the metallic case 5 inward, et. set.

In order to enhance reliability in terms of resistance to liquid leakage and sealing, it is desirable to make the outer diameter of the flange 13b of the cap-shaped terminal plate 13 and the outer diameter of the filter 1 effectively the same with each other.

Further, it is effective to apply a sealing agent to a portion between the flange 13b of the cap-shaped terminal plate 13 and the filter 1 in order to resistance against leakage of electrolyte. It is important not to impair electric conductivity by the way choosing the place, amount of sealing agent. A sealing agent can be selected from fluorine resin, blown asphalt (prepared by dissolving petroleum pitch and the like in such a solvent as toluene and the like) and silicon resin is excellent in preventing the electrolyte from leaking over an extended period of time.

The electric current path is established by connection keeping of the flange 13b of the cap-shaped terminal plate 13 in contact with the filter 1. But if the electric current path control is not intended for a suspension and a recovery, the flange 13b of the cap-shaped terminal plate 13 and the filter 1 is allowed to be joined together by resistance welding or laser welding, thereby enabling the realization of an electric current path capable of handling a large discharge current. Also, by applying a temporary connection to form the foregoing electric current path through welding, such a benefit as simplified handling of components at the time of sealing can be realized. Therefore, such a feature of the present invention as realizing a simple structure, where-by a loss in the available internal volume is minimized, can not be sacrificed by the use of a welding method although the function of controlling a flow of electric currents is lost.

INDUSTRIAL USABILITY

As described in the above, the present invention makes it possible to realize a structural geometry for a sealing plate, which features a simple structure and a minimized loss in the available internal volume and excels in safety and reliability, thereby enabling the realization of a cylindrical type alkaline storage battery, which is small in size, large in storage capacity and high in safety.

What is claimed is:

1. A cylindrical alkaline storage battery comprising:
   a spiral-shaped group of electrodes, said group of electrodes including a positive electrode plate, a negative electrode plate and a plurality of separators;
   a metallic case containing said group of electrodes;
   a sealing plate for sealing a top part of said metallic case, having a safety valve provided therein, said sealing plate comprising: a cap-shaped terminal plate which includes a cap part and a flange; a disc-shaped filter under and in contact with said flange with a gas venting hole near the center thereof; and at least one gas exhaust hole on a surface of said cap-shaped terminal plate, a gap being formed between said filter and said flange from an internal pressure in said battery;
   said safety valve being positioned between said cap part and said filter;
   a space between said metallic case and both a rim of said flange and a rim of said filter, said space being sealed with a gasket;
   wherein an edge of said metallic case is bent inward to apply pressure to said gasket.

2. The cylindrical alkaline storage battery according to claim 1, wherein an outer diameter of said flange is substantially the same as an outer diameter of said filter.

3. The cylindrical alkaline storage battery according to claim 1, wherein a sealing agent occupies an area between said flange and said filter.

4. The cylindrical alkaline storage battery according to claim 3, wherein said sealing agent is a compound selected from the group consisting of fluorine resin, blown asphalt and silicon resin.

5. The cylindrical alkaline storage battery according to claim 1, wherein said flange and said filter are welded using at least one of a resistance welding method and a laser welding method.

6. A cylindrical alkaline storage battery comprising:
   a spiral-shaped group of electrodes, said group of electrodes including a positive electrode plate, a negative electrode plate and a plurality of separators;
   a metallic case containing said group of electrodes;
   a sealing plate which hermetically seals a top part of said metallic case, said sealing plate comprising:
   a cap-shaped terminal plate which includes a cap part and a flange; and
   a disc-shaped filter under said flange with a gas venting hole near the center thereof, a gap being formed between said filter and said flange from an internal pressure in said battery;
   wherein a space between the metallic case and both of a rim of said flange and a rim of said filter are sealed with a gasket by bending an edge of said metallic case inward.

7. The cylindrical alkaline storage battery according to claim 6, wherein an outer diameter of said flange is substantially the same as an outer diameter of said filter.

8. The cylindrical alkaline storage battery according to claim 6, wherein a sealing agent occupies an area between said flange and said filter.

9. The cylindrical alkaline storage battery according to claim 8, wherein said sealing agent is a compound selected from the group consisting of fluorine resin, blown asphalt and silicon resin.

10. The cylindrical alkaline storage battery according to claim 6, wherein said flange and said filter are welded using at least one of a resistance welding method and a laser welding method.

11. A cylindrical alkaline storage battery comprising:
    a spiral-shaped group of electrodes, said group of electrodes including a positive electrode plate, a negative electrode plate and a plurality of separators;
    a metallic case containing said group of electrodes;
    a sealing plate hermetically sealing a top part of said metallic case, said sealing plate comprising:
    a cap part;
    a flange;
    a disc-shaped filter under said flange with a gas venting hole near the center thereof, a gap being formed between said filter and said flange from an internal pressure in said battery; and
    at least one gas exhaust hole on said flange; and
    a space between said metallic case and both a rim of said flange and a rim of said filter, said space being sealed with a gasket;
    wherein an edge of said metallic case is bent inward to apply pressure to said gasket.

12. The cylindrical alkaline storage battery according to claim 11, wherein an outer diameter of said flange is substantially the same as an outer diameter of said filter.

13. The cylindrical alkaline storage battery according to claim 11, wherein a sealing agent occupies an area between said flange and said filter.

14. The cylindrical alkaline storage battery according to claim 13, wherein said sealing agent is a compound selected from the group consisting of fluorine resin, blown asphalt and silicon resin.

15. The cylindrical alkaline storage battery according to claim 11, wherein said flange and said filter are welded using at least one of a resistance welding method and a laser welding method.

* * * * *

UNITED STATES PATENT AND TRADEMARK OFFICE
CERTIFICATE OF CORRECTION

PATENT NO. : 6,596,434 B1
DATED : July 22, 2003
INVENTOR(S) : Takeshi Yoshinaka et al.

It is certified that error appears in the above-identified patent and that said Letters Patent is hereby corrected as shown below:

<u>Title page,</u>
Item [56], References Cited, OTHER PUBLICATIONS,
"Japanese Abstract, Publ. No. 01021860, dated Jan. 28, 1989," should read
-- Japanese Abstract, Publ. No. 01021860, dated Jan. 25, 1989 --

Signed and Sealed this

Sixth Day of April, 2004

JON W. DUDAS
*Acting Director of the United States Patent and Trademark Office*